(12) United States Patent
Legua Gracia

(10) Patent No.: US 10,968,643 B2
(45) Date of Patent: Apr. 6, 2021

(54) TRANSPORTATION SYSTEMS, ELEVATOR SYSTEMS, KITS, TOWER SECTIONS AND METHODS FOR PERFORMING ASSEMBLY OR MAINTENANCE OPERATIONS IN TOWERS

(71) Applicant: ALIMAK GROUP MANAGEMENT AB, Stockholm (SE)

(72) Inventor: Carlos Legua Gracia, La Muela (ES)

(73) Assignee: ALIMAK GROUP MANAGEMENT AB, Stockholm (SE)

( * ) Notice: Subject to any disclaimer, the term of this patent is extended or adjusted under 35 U.S.C. 154(b) by 0 days.

(21) Appl. No.: 16/628,669

(22) PCT Filed: Jul. 4, 2018

(86) PCT No.: PCT/EP2018/068101
§ 371 (c)(1),
(2) Date: Jan. 4, 2020

(87) PCT Pub. No.: WO2019/008042
PCT Pub. Date: Jan. 10, 2019

(65) Prior Publication Data
US 2020/0131786 A1    Apr. 30, 2020

(30) Foreign Application Priority Data
Jul. 5, 2017   (EP) .................................... 17382435

(51) Int. Cl.
*E04G 3/24* (2006.01)
*F03D 13/10* (2016.01)
(Continued)

(52) U.S. Cl.
CPC ................ *E04G 3/246* (2013.01); *B66B 9/00* (2013.01); *E04G 3/28* (2013.01); *E04G 5/14* (2013.01);
(Continued)

(58) Field of Classification Search
CPC ........... E04G 3/24; E04G 3/243; E04G 3/246; E04G 3/28; E04G 3/305; F03D 13/10; F03D 80/50; B66B 9/00
See application file for complete search history.

(56) References Cited

U.S. PATENT DOCUMENTS 2,346,033 A * 4/1944 Marsden ................... E04G 3/24
                                                       182/128
5,007,501 A * 4/1991 Baston .................... E04G 1/152
                                                       182/128
(Continued)

FOREIGN PATENT DOCUMENTS

EP      2187050 A2    5/2010
EP      2826742 A1    1/2015
(Continued)

*Primary Examiner* — Jason C Smith
(74) *Attorney, Agent, or Firm* — Cheryl H. Agris; Agris & von Natzmer, LLP

(57) ABSTRACT

Provided are examples of transportation systems, elevator systems, and kits for use in towers, as well as tower sections and methods for performing assembly or maintenance operations in towers, particularly wind turbine towers, guides mounted in tower sections for transporting an operator or robot along an inside of a tower and an elevator carrying parts of such guides.

18 Claims, 6 Drawing Sheets

(51) Int. Cl.
*F03D 80/50* (2016.01)
*B66B 9/00* (2006.01)
*E04G 3/28* (2006.01)
*E04G 5/14* (2006.01)

(52) U.S. Cl.
CPC ............ *F03D 13/10* (2016.05); *F03D 80/50* (2016.05); *E04G 2003/283* (2013.01)

(56) References Cited

U.S. PATENT DOCUMENTS

| | | | |
|---|---|---|---|
| 2005/0247008 A1* | 11/2005 | Fujiwara | E04G 1/362 |
| | | | 52/651.1 |
| 2015/0107186 A1* | 4/2015 | Wilts | E04G 3/246 |
| | | | 52/741.1 |
| 2015/0184402 A1* | 7/2015 | Gardner | G06F 1/3265 |
| | | | 182/131 |
| 2016/0311659 A1* | 10/2016 | Mertala | B66B 19/002 |
| 2016/0332845 A1* | 11/2016 | Kere | E04G 3/246 |
| 2020/0131786 A1* | 4/2020 | Legua Gracia | B66B 9/00 |
| 2020/0199894 A1* | 6/2020 | Soerensen | E04G 3/305 |

FOREIGN PATENT DOCUMENTS

| | | |
|---|---|---|
| WO | 2007082531 A1 | 7/2007 |
| WO | 2016193297 A1 | 12/2016 |

\* cited by examiner

TRANSPORTATION SYSTEMS, ELEVATOR SYSTEMS, KITS, TOWER SECTIONS AND METHODS FOR PERFORMING ASSEMBLY OR MAINTENANCE OPERATIONS IN TOWERS

This application claims the benefit of European Patent Application EP17 382 435.0 filed on Jul. 5, 2018

The present disclosure relates to a transportation system for performing assembly or maintenance operations in a tower, for example a wind turbine tower; and further relates to an elevator system having a movable guide support structure and a movable guide connected to this support structure. The present disclosure further relates to kits having a transportation system and an elevator system; and methods for performing assembly or maintenance operations in a tower, optionally in a wind turbine tower.

BACKGROUND

Modern wind turbines are commonly used to supply electricity into the electrical grid. Wind turbines generally comprise a rotor mounted on top of a wind turbine tower, the rotor having a rotor hub and a plurality of blades. The rotor is set into rotation under the influence of the wind on the blades. The operation of the generator produces the electricity to be supplied into the electrical grid.

Towers may be constituted by tower sections (i.e. "tower rings") which are mounted on top of each other. In the case of e.g. wind turbines, a plurality (e.g. three, four or five or more) contiguous stacked tower sections may be welded together and/or joined through flanges (or the like) to form an entire tower. These tower sections may be formed by one or more tower segments ("part rings") coupled together at corresponding edges to form the entire tower section. These tower sections may be preassembled at a factory workshop, e.g. by welding the corresponding edges of the tower segments, or in situ, e.g. by building an internal temporary structure for positioning the tower segments in place and joining them. Tower segments and tower sections may be found in both steel and concrete wind turbine towers.

In wind turbine applications there is a trend to build increasingly higher towers in order to obtain increased power. Increased height results in higher diameters and in some cases in more tower sections. Therefore, more joining operations or joining operations taking a long time are required. Such joining operations may be bolting one flange of one tower section to the following one. This may require large quantities of bolts and nuts which are connected with a specific tightening torque. The tightening torque of these bolting connections needs to be inspected and tightened periodically.

When maintenance works, e.g. involving inspection and tightening a bolted connection in a tower are required inside wind turbines, hoists are often used in the form of elevator-like structures where a lift platform or an elevator car for the transportation of people and/or equipment is hoisted up and/or down within the wind turbine tower. Wind turbines are often provided with working platforms arranged at various heights along the height of the tower with the purpose of allowing workers to leave the elevator car and inspect or repair equipment where intended.

These platforms are typically permanently built at the top of each of the tower sections, which allows a safe access to the operators during the tower construction or the maintenance works. Maintenance works as inspecting and tightening a bolted connection may be scheduled once a year. In some cases, such fixed platforms have no further functions.

Furthermore, platforms typically comprise heavy supporting structures and plates attached to the wind turbine tower. In addition, a platform generally comprises hatches and/or fences for protecting ladder holes and/or elevator holes. These platforms can thus be complex and heavy.

Platforms in steel towers are generally welded to the internal side of the tower through supporting brackets. Welding such brackets to the internal wall of the tower can require long fillet welds which reduce the fatigue strength of the tower.

In addition, hoisting large and heavy components within the wind turbine tower requires an internal area free of obstacles which can become more complicated due to the use of the platforms. For this reason, some large components are hoisted outside the tower. This operation is complex and time consuming and may require firstly mounting a crane in the nacelle and then lifting the component.

The present disclosure provides examples of systems and methods that at least partially resolve some of the aforementioned disadvantages.

These disadvantages are not only found in wind turbine towers, but instead may be found in many different sites and structures.

SUMMARY

In a first aspect, a transportation system for performing assembly or maintenance operations is provided. The transportation system comprises a fixed guide attached to a tower structure, e.g. a wind turbine tower, for guiding a transportation unit. The transportation system further comprises a transportation unit comprising an undercarriage for displacing the transportation unit along the fixed guide.

In this aspect, the transportation unit may displace along the fixed guide attached to the tower structure, e.g. a wind turbine tower, for performing assembly or maintenance operations in a tower. Examples of these assembly operations may be joining a lower tower section to an upper tower section by for example bolting the top flange of the lower section to the bottom flange of the upper section. Examples of maintenance operations may be for example inspecting the tightening torque of bolts connecting to tower sections or tightening these bolts. Other operations such as installing or inspecting sensors, e.g. strain gauges, or electrical cables or lights may also be regarded as assembly or maintenance operations.

The transportation system allows the transportation unit to displace along the fixed guide to the area when an assembly or maintenance operation needs to be performed. Therefore, no permanent platforms are required in a wind turbine tower section for performing assembly or maintenance operations. As a result, the wind turbine tower has a large internal area free of obstacles that allows hoisting large and heavy components within the wind turbine tower. Furthermore, the transportation system is cheaper than a fixed platform because in fixed platforms assembling operations for manufacturing the platform may be complex and more material may be required than in a transporting system. In addition, the transportation system is easier to be assembled and disassembled inside a previously installed tower than fixed platforms. The transportation system arranged inside the tower may thus be more easily retrofitted than fixed platforms.

In addition, as the fixed guide is lighter than a platform, the overall weight of the wind turbine may be reduced and less supporting elements or brackets attached to the wind turbine tower are required. Consequently, such brackets may require shorter fillet welds than for those supporting heavy platforms. In this way, the fatigue strength in comparison with the situation in which platforms are attached to the tower may be improved. As a result, the weight of towers may be reduced and towers may thus be cheaper.

In some examples, the fixed guide may be configured to be connected to a movable guide configured to be mounted in an elevator car of an elevator system. In this way, the fixed guide may be connected to a movable guide to extend the track of the transportation unit. The movable guide may be mounted in an elevator car and may thus be lifted by the elevator car. Such a transportation system allows the elevator car going up and down without interfering with the fixed guide of the transportation system.

In some examples, the fixed guide extends from a first end to a second end less than 360° along an internal circular perimeter of a tower structure. In some examples, the fixed guide 20 may extend less than 330°, and optionally less than 300° along the circular perimeter of the wall of the wind turbine tower. The fixed guide may be substantially horizontal.

In some examples, the transportation unit comprises a robot. Such a robot may inspect and/or tighten a bolted connection. In this way, preventive or predictive maintenance operations may be automated and fewer personnel may be required. In addition, the transportation unit may comprise a camera. In those examples where the transportation unit comprises a robot, the fixed guide may extend 360° along an internal circular perimeter of the tower and the robot may thus be displaced along the fixed guide. In these examples, a tower may comprise several fixed guides arranged at different heights and each of them may comprise a robot. According to this aspect, performing assembly or maintenance operations in a tower may be done by providing a transportation system having a fixed guide extending 360°, placing a robot on the fixed guide and horizontally displacing the robot along the fixed guide to a desired position.

In some examples, the robot may be configured to be mounted on an elevator car and the fixed guide may extend from the first end to a second end less than 360° along an internal circular perimeter of a tower structure.

In some examples, the transportation unit may be a trolley configured to host an operator in a tower, e.g. a wind turbine tower. Therefore, an operator may be transported by the trolley along the fixed guide and then the operator may perform several maintenance operations along the fixed guide.

In addition, a fixed guide extending 360°, i.e. along the whole perimeter of a tower structure, may also be used in transporting units having a trolley. In these examples, a trolley may be permanently mounted on the fixed guide. In some examples, a tower may comprise several fixed guides arranged at different heights and each of them may comprise a trolley. Alternatively, the trolley may only be mounted on the fixed guide when required by for example hoisting it with an internal hoisting system. An operator may access to the trolley from an elevator car of an elevator system or from a ladder. According to this aspect, performing assembly or maintenance operations in a tower may comprise providing a transportation system having a fixed guide extending 360°, placing a trolley on the fixed guide, accessing the trolley and horizontally displacing the trolley along the fixed guide to a desired position.

In some examples, the transportation unit may be configured to be mounted on an elevator car of an elevator system. In this way, the transportation unit may travel with the elevator car along the tower. A single transportation unit may thus be used in several fixed guides arranged at several heights of a wind turbine tower.

In a further aspect, an elevator system for a tower structure, optionally for a wind turbine tower, comprising a vertically displaceable elevator car, wherein the elevator car comprises a movable guide support structure and a movable guide connected to the support structure is provided. The movable guide is configured to be connected to a fixed guide attached to a tower structure, e.g. a wind turbine tower, and further configured to guide a transportation unit.

In this aspect, a movable guide may be moved up or down by the elevator to be placed in a position to be connected to a fixed guide.

In some examples, the support structure and the movable guide are configured to support a transportation unit. In this way, the transportation unit may also be lifted by the elevator car. The elevator system may thus be configured to vertically displace the elevator car and the transportation unit.

In a yet further aspect, a kit for performing assembly or maintenance operations in a tower structure comprising a transportation unit according to any of the examples described herein and an elevator system comprising an elevator car according to any of the examples disclosed herein is provided.

In this aspect, the movable guide mounted on the elevator car may be connected to the fixed guide attached to the tower. Consequently, the transportation unit may be guided along the fixed guide and along the movable guide.

In some examples, the kit may comprise a first connecting guide for detachably connecting the movable guide of the elevator car and the fixed guide of the transportation system.

In further examples, the first connecting guide may be configured to connect a first end of the fixed guide to a first end of the movable guide. In addition, a second connecting guide may be configured to connect a second end of the fixed guide to a second end of the movable guide.

In a yet further aspect, a method for performing assembly or maintenance operations in a tower structure, in particular in a wind turbine tower, is provided. The method comprises providing an a kit according to any of the examples disclosed herein;

placing the transportation unit on the movable guide of the elevator car; aligning the movable guide of the elevator car and the fixed guide; connecting the movable guide and the fixed guide; and horizontally displacing the transportation unit along the movable guide and/or the fixed guide to a desired position.

BRIEF DESCRIPTION OF THE DRAWINGS

Non-limiting examples of the present disclosure will be described in the following, with reference to the appended drawings, in which.

DETAILED DESCRIPTION OF EXAMPLES

In these figures the same reference signs have been used to designate matching elements.

Figure 1:
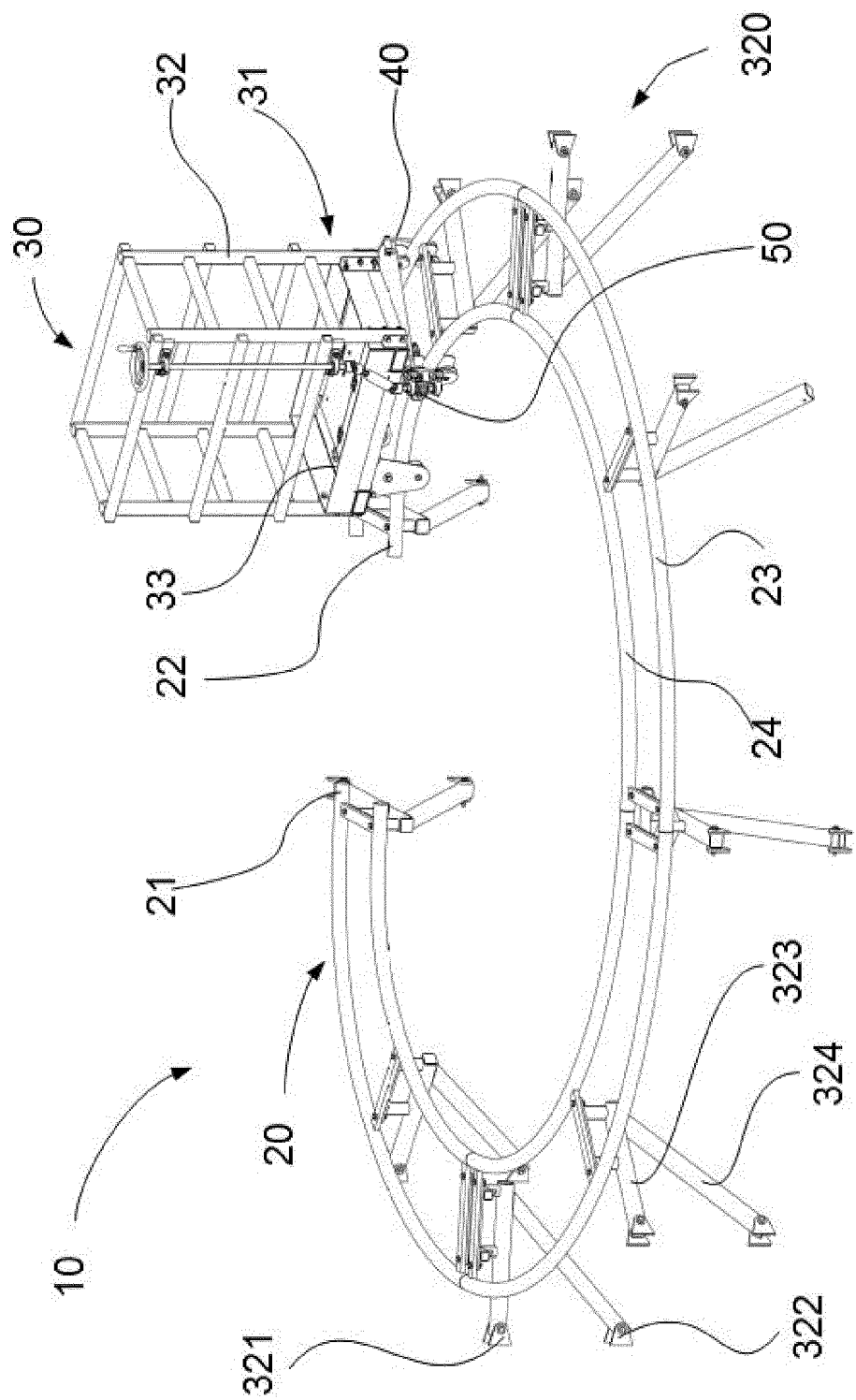
FIG. 1 shows an example of a transportation system comprising a fixed guide and a transportation unit.

FIG. 1 shows an example of a transportation system 10 for performing assembly or maintenance operations in a wind turbine tower (not shown in FIG. 1 for clarity purposes). The transportation system 10 comprises a fixed guide 20 attached to a wind turbine tower (not shown in FIG. 1 for clarity purposes) for guiding a transportation unit 30. The transportation unit 30 comprises an undercarriage 40 for displacing the transportation unit 30 along the fixed guide 20. The fixed guide 20 is configured to be connected to a movable guide (not shown in FIG. 1).

In these examples, the fixed guide 20 may extend from a first end 21 to a second end 22 less than 360° along an internal circular perimeter of a wind turbine tower. In some examples, the fixed guide 20 may extend less than 330°, and optionally less than 300° along the circular perimeter of the wall of the wind turbine tower.

In examples, the fixed guide may extend between 270° and 350°.

Alternatively, the fixed guide may extend between 30° and 120°, for example approximately around 60°. In these examples, such a length may be sufficient for performing maintenance operations, such as installing or inspecting lamps or lights.

In all of these examples, the fixed guide extends from a first end 21 to a second end 22 along an angle that is sufficient positioning the transportation unit 30 in a position for performing maintenance or assembly operations.

In a yet further examples, the fixed guide may extend along the whole internal perimeter of a tower structure.

The fixed guide of FIG. 1 comprises an outer rail 23 and inner rail 24 being substantially parallel to each other. In this way, the stability of the transportation unit may be improved. In these examples, rails have a substantially circular cross-section. Alternatively, rails may have a substantially rectangular cross-section with rounded edges.

Alternatively, the fixed guide may comprise a single rail. In some of these examples, the fixed guide may be a toothed guide mounted in the wind turbine tower and the undercarriage of the transportation unit may comprise a pinion wheel configured to mesh with this toothed guide.

In some examples, the fixed guide may comprise a mounting assembly 320 configured to be connected to an internal side of the wall of a wind turbine tower section for connecting the fixed guide 20 to the tower section. The mounting assembly 320 may further comprise a top bracket 321 and a bottom bracket 322 configured to be connected to tower wall, e.g. configured to be welded to the internal side of the wall. In addition, the mounting assembly 320 may comprise a transversal connecting bar 323 connected the top bracket 321 and supporting the outer rail 23 and the inner rail 24. The mounting assembly 320 may additionally comprise an inclined strut 324 connected to the bottom bracket 322 and supporting the transversal connecting bar 323. In some examples, the fixed guide may comprise several mounting assemblies. In other examples, the mounting assembly may form part of a tower segment.

In this example, the transportation unit 30 is a trolley configured to host an operator in a tower structure, e.g. a wind turbine tower. The operator may thus be horizontally displaced by the trolley along the guide. Alternatively, the transportation unit 30 may be a robot or a basket having a camera. In other examples the trolley may comprise a robot and/or a camera. A robot or a camera may allow performing some operations, e.g. inspecting or monitoring, without directly involving operators.

The trolley 30 may comprise a structure 31 having a platform 33 for supporting or hoisting an operator and a guard rail system 32. The operator may thus safely perform assembly or maintenance operations from the trolley 30. In addition, some tools e.g. a battery drill and/or hydraulic torque wrench, may also be transported in the trolley. Bolts and nuts for connecting two tower segments may also be transported in the trolley.

In addition, the trolley 30 may comprise a driving system 50 for driving the undercarriage. In some examples, the driving system 50 may be operated from the trolley or from the transportation unit. Alternatively or additionally, the driving system may be operated externally from transportation unit as for example from an elevator car or from the base of the wind turbine tower.

In some examples, the operator supported by the transportation unit 30 may displace the transportation unit by for example pushing it away from the internal wall of the tower. According to this aspect, a driving system for driving the undercarriage may thus not be required.

Figure 2:
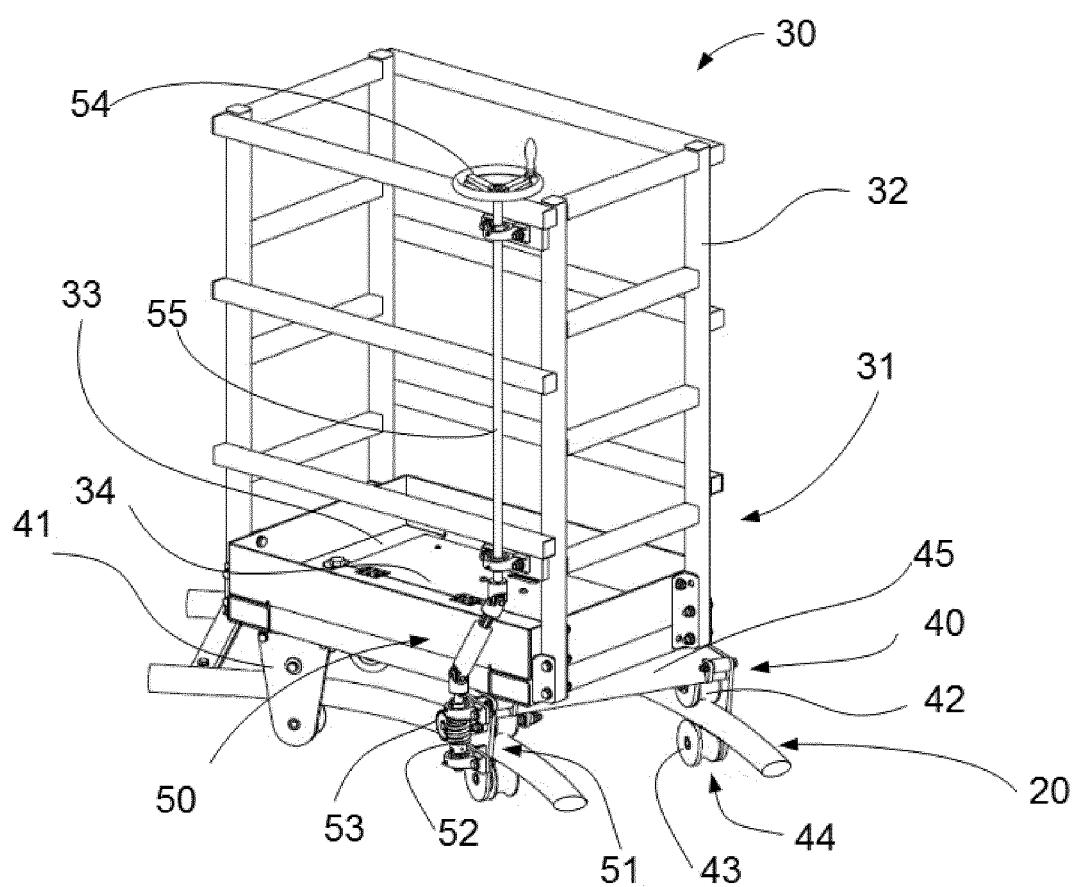
FIG. 2 shows the transportation unit of FIG. 1.

FIG. 2 shows a zoomed-in view of the transportation unit 30 of FIG. 1. In this example, the undercarriage 40 of the transportation unit is rotatably connected to the structure 31 for horizontally rotating the structure 31 with respect to the undercarriage 40. The transportation unit may thus be adapted to be displaced along guides having different curvature radius, i.e. adapted to be displaced along fixed guides mounted on different heights. The transportation unit may further be displaced along guides having a substantially circular portion and a substantially straight portion as for example a substantially circular fixed guide connected to a substantially straight movable guide as will be explained in more detail later on. Thereby, adaptability to different guides and to different heights within a wind turbine tower may be improved.

In some examples, the undercarriage 40 may comprise a wheel assembly 41 having at least one main wheel 42 for rolling along the fixed guide. In addition, the wheel assembly 41 may comprise a secondary wheel 43, wherein the main wheel 42 and the secondary wheel are partially arranged on the opposite sides of the fixed guide, e.g. an inner and/or an outer rail of the fixed guide. In the example of FIG. 2 the main wheel 42 is placed above the guide and the secondary wheel 43 is positioned relative to the guide in such a way that guide 20 is arranged between the main wheel 42 and the secondary wheel 43. Therefore, the main wheel and the secondary wheel may engage the guide. In some examples, the main wheel may further comprise a recess 44 engaging the guide. Such a recess 44 may have a substantially similar shape as the guide. Alternatively or additionally, the secondary wheel 43 may comprise a recess 44. The wheel assembly configuration of these examples can prevent the transportation unit from falling down and can increase its stability.

In the example of FIGS. 1 and 2, the undercarriage 40 comprises four wheel assemblies 41 and a frame 45 (only indicated in FIG. 2) connecting the wheel assemblies 41 in pairs. Thus, one wheel assembly of the one pair of wheel assemblies may engage the inner rail and the other wheel assembly of this pair of wheel assemblies may engage the outer rail.

Alternatively, the frame 45 may connect two wheel assemblies 41, wherein one of two wheel assemblies may engage the inner rail and the other one the outer rail.

In the example of FIGS. 1 and 2, the platform 33 of the trolley comprises a hatch 34 (only indicated in FIG. 2). Such a hatch 34 may therefore be arranged on the bottom of the trolley and may consequently allow an operator accessing or leaving the trolley from below, for example from an elevator car as will be explained in further detail below.

In these examples, the driving system 50 comprises a worm drive 51 for driving the transportation unit 30. The worm drive 51 may have a worm screw 52 and worm gear 53 connected to a wheel assembly 40, e.g. connected to a main wheel 42, wherein the worm screw engages the worm gear. Other mechanical driven systems may also be suitable e.g. different gear configurations or chains.

Alternatively, in those examples wherein the fixed guide is a toothed guide, the worm gear may be connected to a pinion wheel which meshes such a toothed guide. In some examples, the worm gear may act as a pinion wheel directly meshing the toothed guide.

The driving system 50 of FIG. 2 is configured to be manually driven and specifically the driving system 50 comprises a crank 54 for manually driving the driving system. The movement of crank 54 may be provided to the worm drive by a shaft 55. In some examples, the shaft 55 may comprise ball-joints to transform a circular movement of the crank to a linear movement of the worm screw.

Alternatively or additionally, the driving system may comprise a motor, specifically an electrical motor, and more specifically the motor may be a battery drill.

In other examples, an operator hosted by the trolley may directly displace the trolley along the fixed guide by pushing.

Figure 3:
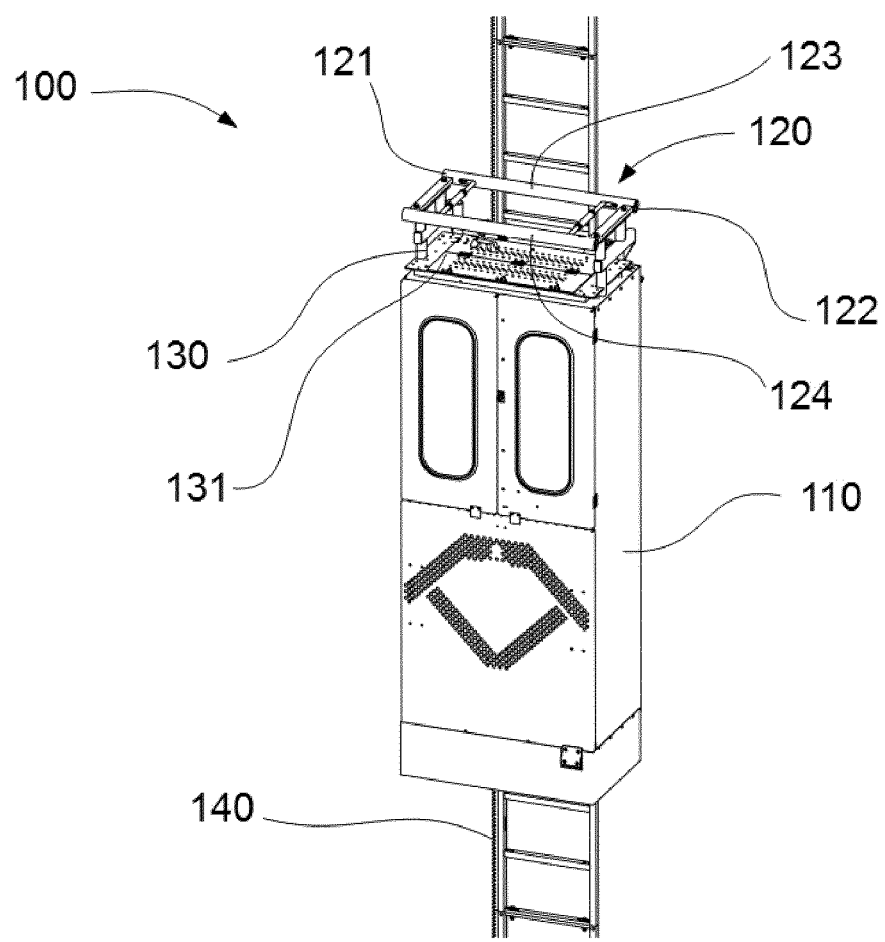
FIG. 3 shows an example of an elevator system of a wind turbine tower.

FIG. 3 shows an example of an elevator system 100 of a wind turbine tower (not shown for clarity purposes). The elevator system 100 comprises an elevator car 110 that is vertically displaceable along the wind turbine tower. The elevator car 110 comprises a movable guide support structure 130 and a movable guide 120 connected to the support structure 130. The movable guide 120 is configured to be connected to a fixed guide attached to a wind turbine tower. The movable guide 120 is additionally configured to guide a transportation unit.

Although not shown in FIG. 3, a transportation unit, e.g. a trolley, may be mounted on the movable guide and the transportation unit may also be lifted by the elevator car. The elevator system may thus be configured to vertically displace the elevator car and the transportation unit.

In some examples, the movable guide 120 may be releasably connected to the elevator car 110. According to this aspect, the movable guide 120 and/or the movable guide support structure 130 may be disconnected from the elevator car 110. This may enable mounting the movable guide on an elevator car only when required. Consequently, systems of the elevator, e.g. safety systems, do not interfere with the movable guide during a regular use of the elevator system. For example, providing a releasable connection between the movable guide and the elevator car, may allow retrofitting an existing elevator system having a relatively limited space for mounting the movable guide.

In the example of FIG. 3, the movable guide support structure 130 is mounted on the roof the of the elevator car 110. Alternatively, the support structure may be formed by the roof of the elevator car. In some examples, the elevator car may further comprise a hatch 131 arranged on the top of the elevator for accessing to the elevator car 110. Such a hatch 131 may allow an operator leaving and/or going into the elevator car. In this way, when a transportation unit is also provided with a hatch in the platform, operator's displacements from the elevator car to the transportation unit or vice versa may be more securely performed.

Alternatively, the movable guide support structure 130 may be mounted on the roof or be formed by the roof or mounted on a lateral side of the elevator car 110.

In these examples, the movable guide 120 extends from a first end 121 to a second end 122. The position of the first end 121 may substantially correspond to one lateral side of the elevator car, while the position of the second end 122 may correspond to the opposite side of the one lateral side of the elevator car. In this way, the movable guide may substantially extend from one lateral side of the elevator car to the opposite lateral side. The first end 121 and the second end 122 of the movable guide may additionally be configured to be respectively connected to a first end and to a second end of a fixed guide.

Furthermore, the movable guide of FIG. 3 comprises an outer rail 123 and inner rail 124 being substantially parallel to each other, which may be connected to the corresponding inner and outer rail of a fixed guide.

The elevator system of FIG. 3 comprises a rack 140 mounted on a wind turbine tower. In some examples, the rack 140 may form part of an internal ladder. A pinion system coupled to the elevator car (not shown) engages the rack for going up and down the elevator car. In other examples, the elevator may be suspended and moved through wires ropes.

Figure 4:
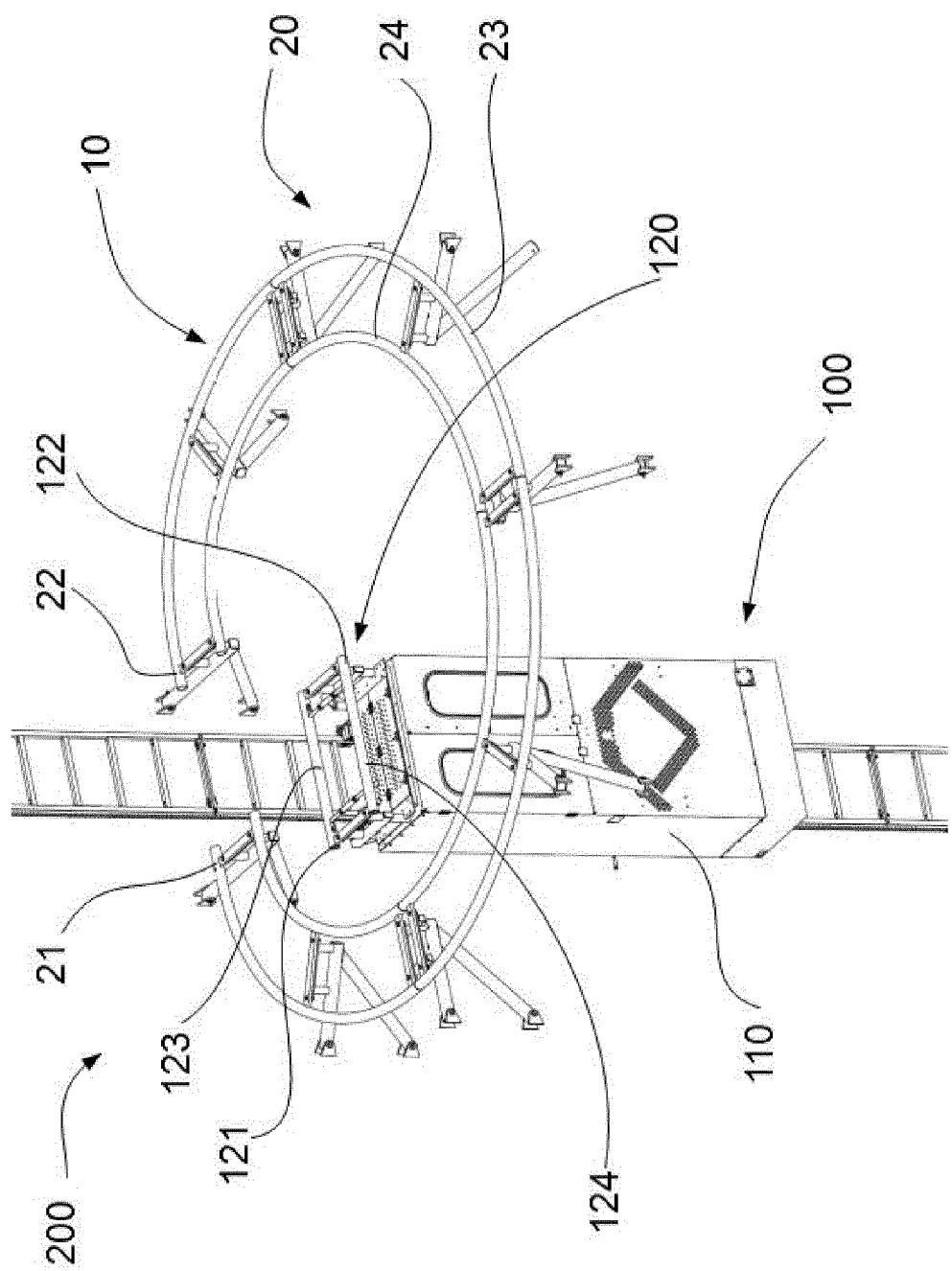
FIG. 4 shows an example of a part of a kit comprising a transportation system and an elevator system.

FIG. 4 shows an example of a part of a kit 200 for performing assembly or maintenance operations in a tower structure comprising a transportation system 10 and an elevator system 100 according to any of the examples above described. The transportation system 10 comprises a transportation unit (although a transportation unit has not been illustrated in FIG. 4 it should be clear that the transportation system comprises a transportation unit according to examples disclosed herein) and a fixed guide 20. The elevator system 100 comprises an elevator car 110 and a movable guide 120. The movable guide 120 is configured to guide the transportation unit of the transportation system 10. The fixed guide 20 and the movable guide 120 are configured to be connected.

In some examples, the kit 200 may comprise a connecting guide for detachably connecting the movable guide 120 of the elevator car 110 and the fixed guide 20 of the transportation system 10. Such a connecting guide may be a sleeve that may be arranged internally within the movable guide and the fixed guide providing a connection that allows a transportation unit circulating from the movable guide to the fixed guide and vice versa. In other examples, the connecting guide may be arranged externally in such a way that clamps the movable and the fixed guide.

In some examples, the elevator car comprises a hatch arranged on the top of the elevator car (as shown in FIG. 3) and the transportation unit comprises a platform with a hatch (as shown in FIG. 2). The hatch of the elevator and the hatch of the transportation unit may be arranged in such a way that an operator may access the transportation unit from the elevator car through the hatch of the elevator car and the hatch of the transportation unit.

Figure 5:
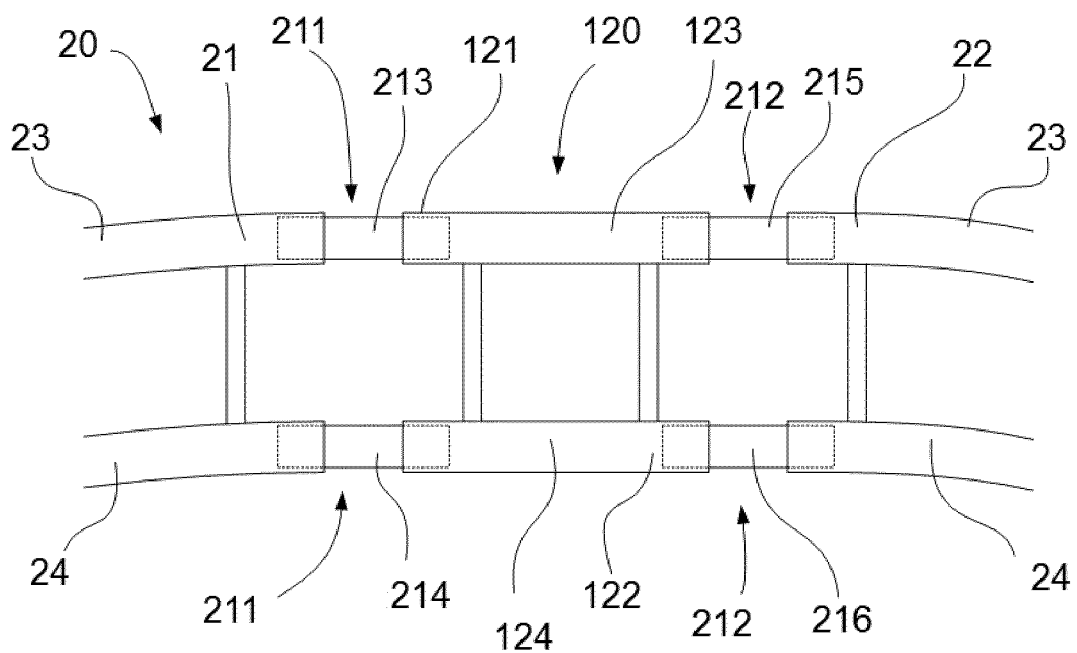
FIG. 5 schematically shows a top view of a portion of a kit according to one example.

FIG. 5 schematically shows a top view of a portion of a kit according to one example wherein a movable guide 120 is connected to a fixed guide 20.

In the example of FIG. 5, the kit comprises a first connecting guide 211 for detachably connecting the first end of the movable guide 121 to the first end of the fixed guide 21. In this example, the fixed guide is substantially circular and the movable guide is substantially straight.

The first connecting guide 211 of the example comprises an outer first connecting guide 213 connecting an outer rail 23 of the fixed guide and an outer rail 123 of the movable guide 120 and an inner first connecting guide 214 connecting an inner rail 24 of the fixed guide and an inner rail 124 of the movable guide 120.

In addition, the kit may comprise a second connecting guide 212 for detachably connecting the second end of the fixed guide 22 and the second end of the movable rail 122. The second connecting guide 212 may comprise an outer second connecting guide 215 connecting an outer rail 23 of the fixed guide and an outer rail 123 of the movable guide and an inner second connecting guide 216 connecting an inner rail 24 of the fixed guide and an inner rail 124 of the movable guide 120.

In some examples, the first connecting guide 211 and/or the second connecting guide 212 may comprise e.g. a telescopic extension extending from the fixed guide to the movable guide. Alternatively, the telescopic extension may extend from the movable guide to the fixed guide.

In a further aspect, a kit according to any of the examples disclosed herein allows performing assembly or maintenance operations in a wind turbine in a safety way without heavy and large platforms mounted inside the tower.

An example of a method of performing assembly or maintenance operations in a tower structure, in particular in a wind turbine tower, comprises providing a kit 200 according to any of the examples discloses herein and placing the transportation unit 30 on the movable guide 120 of the elevator car 110. When the transportation unit is not in use, the transportation unit may be stored in one fixed guide or on a base of a wind tower. Then, the movable guide 120 and the fixed guide 20 are aligned. In some examples, aligning the movable guide and the fixed guide may comprise vertically displacing the elevator car, e.g. going up the elevator car having the transportation unit mounted on the elevator to reach the position of the fixed guide. In addition, the method may comprise connecting the movable guide and the fixed guide by e.g. using a first connecting guide. In some examples, connecting the movable guide and the fixed guide may further comprise connecting the first end of the movable guide to the first end of the fixed guide and may additionally include connecting the second end of the movable guide to the second end of the fixed guide. The method further comprises horizontally displacing the transportation unit along the movable guide and/or the fixed guide to a desired position. Therefore, an operator and/or a robot may be vertically displaced to reach the height of the fixed guide and may then be horizontally displaced to reach the desired position to perform maintenance or assembly operations, e.g. tightening bolts or inspection a bolt connection.

Figure 6:
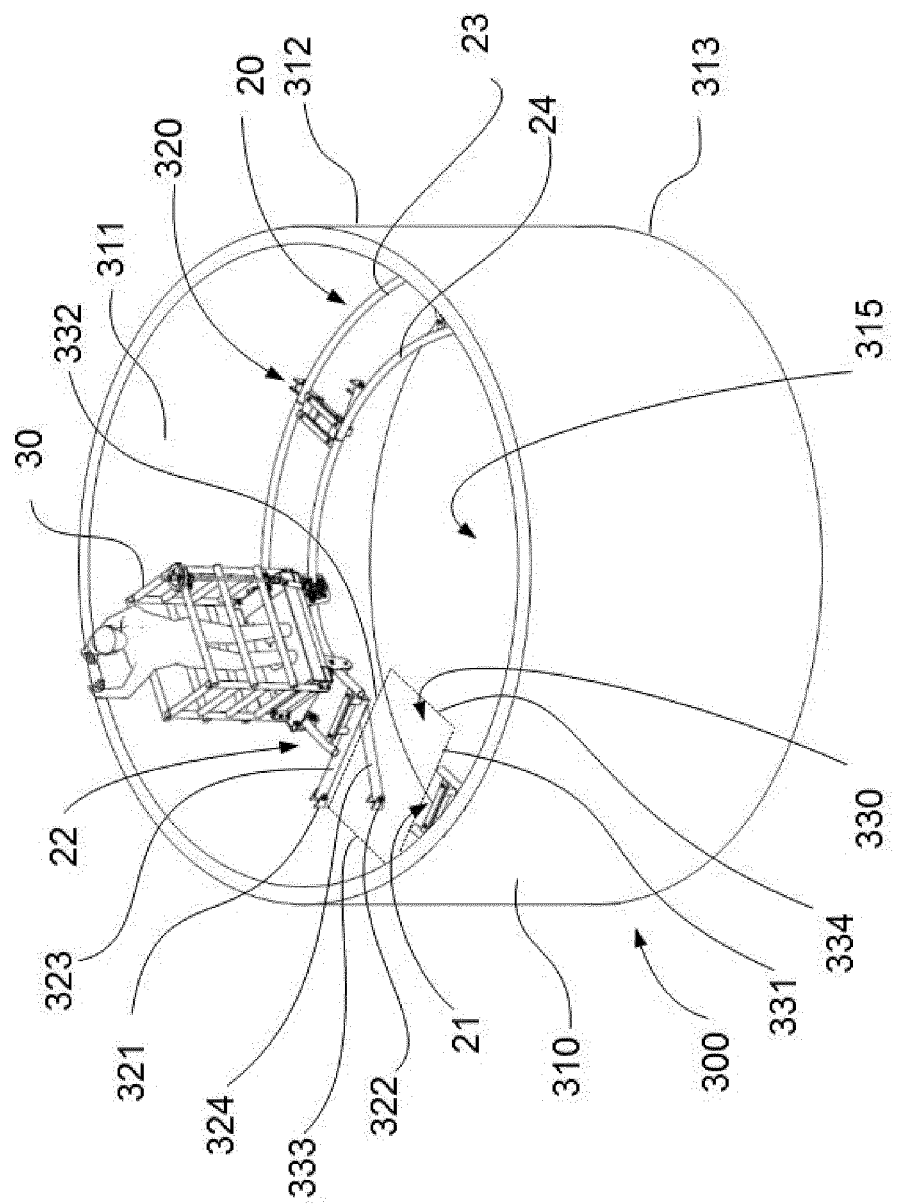
FIG. 6 shows a wind tower section comprising a fixed guide for guiding a transportation unit.

FIG. 6 shows a wind tower section 300 comprising a fixed guide 20 for guiding a transportation unit 30. The wind turbine tower section 300 comprises a substantially cylindrical wall 310 comprising an internal side 311 and an external side. The substantially cylindrical wall 310 extends vertically from a bottom portion 313 to a top portion 312. The wind turbine section 300 in this example further comprises a fixed guide 20 for guiding a transportation unit 30 extending along the internal side 311 of a perimeter of the wall 310. The tower section 300 may additionally comprise a mounting assembly 320 attached to the internal side of the wall connecting the fixed guide to the wall. The mounting assembly 320 may be according to any of the examples herein described. In this aspect, the mounting assembly may comprise a top bracket 321 and a bottom bracket 322. In addition, the mounting assembly may comprise a transversal connecting bar 323 and an inclined strut 324. In some examples, the top 321 and the bottom 322 brackets may be welded to the internal wall of the tower.

In some examples, the wind turbine section comprises a transportation system according to any of the previously described examples.

In some examples, the fixed guide 20 may partially extend from a first end 21 to a second end 22. The fixed guide 20 may therefore extend less than 360° along the circular perimeter of the wall. In these examples, the fixed guide maybe configured to be connected to a movable guide mounted on an elevator car of an elevator system.

Alternatively, the fixed guide may extend along the whole circular perimeter of the wall.

The fixed guide may be according to any of the examples described herein, for example the fixed guide may extend from a first end 21 to a second end 22 less than 360° along the circular perimeter of the wall. For example, the fixed guide may comprise an outer rail 23 and an inner rail 24.

In some examples, the top portion 312 and/or the bottom portion 313 may comprise a flange for bolting this section to another section.

In some examples, the fixed guide 20 may be placed relatively close to the flange of the top portion 312 for easily reaching the bolts connecting two tower sections. Therefore, the top and the bottom brackets may be welded in the flange or relatively close to the flange.

In some examples the wind turbine tower section 300 may comprise an elevator path 330 vertically extending along the internal side of the wall 311 of a tower. The elevator path is configured to allow the vertical movement of an elevator car of an elevator system. An elevator path may be defined as the volume required for moving up and down an elevator car without interfering without other elements, such as the fixed guide. Therefore, in cases where the tower section comprises an elevator, the elevator path 330 is the volume necessary for the movement of the elevator car.

The elevator path 330 may extend vertically and radially, e.g. first radial side 331 and a second radial side 332 extending substantially in a radial direction with respect to a cross-section of the tower. In some examples the first radial side 331 and the second radial side 332 may be substantially parallel to each other. In addition, the elevator path may have an outer vertical tangential side 333 and an inner vertical tangential side 334 extending substantially in a tangential direction with respect to a cross section of the tower. In some examples, the outer tangential side 333 and the inner tangential 334 are parallel to each other.

In this aspect, the first end of the fixed guide 21 may extend from one vertical side 331 of the elevator path. In addition, the second end of the fixed guide 22 may extend from the opposite vertical side 332 to the first end of the fixed guide 21.

Furthermore, the wind turbine tower section 300 may comprise a central cavity 315 defined by the internal wall, the fixed guide and the elevator path (if any). The central cavity 315 continuously extends from the bottom portion 313 to the top portion 312 of the wind turbine section. The central cavity 315 is the volume of the tower free of obstacles, e.g. free of the fixed guide or the elevator path, which allows hoisting large and heavy components within the wind turbine tower section.

Furthermore, the wind turbine section 300 may comprise several fixed guides vertically arranged along the wind tower section.

In a further aspect, a wind turbine tower may comprise at least one wind turbine tower section 300 according to any of the examples disclosed herein. In some examples, the wind turbine tower may comprise three or four or more wind turbine tower sections 300.

In some examples, the tower may comprise a tower section 300 according to any of the examples disclosed herein; an elevator system according to any of the examples previously described having an elevator car displacing along the elevator path 330 of the tower section 300 and a transportation 30 unit configured to displace along the fixed guide 20 and the movable guide.

In some examples, the tower may comprise a transportation system according to any of the examples disclosed herein.

In some examples, the tower may comprise a kit according to any of the examples disclosed herein.

In a further aspect, a method of performing assembly or maintenance operations in a wind turbine tower is provided. The method comprises providing a wind turbine tower according to any of the of the examples disclosed herein, placing a transportation unit on the movable guide of the elevator car; aligning the movable guide and the fixed guide; connecting the movable guide and the fixed guide; and horizontally displacing the transportation unit along the movable guide and/or the fixed guide to a desired position. In some examples, when the tower comprises several fixed guides, the transportation unit may be stored in one of the fixed guides before being placed in the movable guide. Alternatively, the transportation unit may be stored in the elevator car.

For reasons of completeness, various aspects of the present disclosure are set out in the following numbered clauses:

Clause 1. A transportation system for performing assembly or maintenance operations in a tower structure, the transportation system comprising:
a fixed guide attached to a tower structure for guiding a transportation unit;
a transportation unit comprising an undercarriage for displacing the transportation unit along the fixed guide.

Clause 2. A transportation system according to clause 1, wherein the fixed guide is configured to be connected to a movable guide configured to be mounted in an elevator car of an elevator system.

Clause 3. A transportation system according to any of the preceding clauses, wherein the fixed guide extends from a first end to a second end less than 360° along an internal circular perimeter of a tower structure.

Clause 4. A transportation system according to any of clauses 1-2; wherein the fixed guide extends 360° along an internal perimeter of a tower structure.

Clause 5. A transportation system according to any of the preceding clauses, wherein the fixed guide comprises an outer rail and an inner rail; and optionally the outer rail and the inner rail are substantially parallel.

Clause 6. A transportation system according to any of clauses 1-4, wherein the fixed guide comprises a single rail.

Clause 7. A transportation system according to any of the preceding clauses, wherein the fixed guide comprises a mounting assembly configured to be attached to the internal side of a tower structure for connecting the fixed guide to a tower structure.

Clause 8. A transportation system according to clause 7, wherein the mounting assembly comprises a top bracket and a bottom bracket.

Clause 9. A transportation system according to clause 8, wherein the top bracket and the bottom bracket are configured to be welded to an internal side of a tower structure.

Clause 10. A transportation system according to any of clauses 8-9, wherein the mounting assembly comprises:
a transversal connecting bar connected to the top bracket and supporting the external and the internal rails; and
an inclined strut bar connected to the bottom bracket and supporting the transversal connecting bar.

Clause 11. A transportation system according to any of clauses 7-10, wherein the fixed guide comprises several mounting assemblies.

Clause 12. A transportation system according to any of the preceding clauses, wherein the transportation unit comprises a robot.

Clause 13. A transportation system according to any of the preceding clauses, wherein the transportation unit is a trolley configured to host an operator in a tower structure.

Clause 14. A transportation system according to clause 13, wherein the transportation unit comprises a structure having a platform for supporting an operator and a guard rail system.

Clause 15. A transportation system according to clause 14, wherein the platform of the transportation unit comprises a hatch.

Clause 16. A transportation system according to any of clauses 14-15, wherein the undercarriage of the transportation unit is rotatably connected to the structure for horizontally rotating the structure with respect to the undercarriage.

Clause 17. A transportation system according to any of the preceding clauses, wherein the undercarriage of the transportation unit comprises a wheel assembly having at least one main wheel for rolling along the fixed guide.

Clause 18. A transportation system according to clause 17, wherein the wheel assembly further comprises a secondary wheel, and wherein the main wheel and the secondary wheel are at least partially arranged on the opposite sides of the fixed guide.

Clause 19. A transportation system according to any of clauses 17-18, wherein the main wheel and/or the secondary wheel comprises a central recess engaging the fixed guide.

Clause 20. A transportation system according to any of clauses 17-19, wherein the undercarriage of the transportation unit comprises at least two wheel assemblies and a frame connecting the at least two wheel assemblies.

Clause 21. A transportation system according to clause 20, wherein the undercarriage comprises four wheel assemblies connected by the frame in pairs.

Clause 22. A transportation system according to any of the preceding clauses, wherein the undercarriage of the transportation unit comprises a pinion wheel configured to mesh with a toothed guide mounted in a tower structure.

Clause 23. A transportation system according to clause 22, wherein the fixed guide is the toothed guide.

Clause 24. A transportation system according to any of the preceding clauses, wherein the transportation unit further comprises a driving system for driving the undercarriage.

Clause 25. A transportation system according to clause 24 wherein the driving system comprises a worm drive having a worm screw and a worm gear connected to one of the main wheels or to the pinion wheel, wherein the worm screw engages the worm gear.

Clause 26. A transportation system according to clause 25, wherein the driving system is manually driven, and specifically the driving system comprises a crank for manually driving the driving system.

Clause 27. A transportation system according to any of clauses 24-26, wherein the driving system comprises a motor, specifically an electrical motor, and more specifically the motor is a battery drill machine.

Clause 28. A transportation system according to any of the preceding clauses, wherein the transportation unit is configured to be mounted on an elevator car of an elevator system.

Clause 29. A transportation system according to any of the preceding clauses, wherein the fixed guide is substantially horizontal.

Clause 30. A transportation system according to any of the preceding clauses, wherein the tower structure is a wind turbine tower.

Clause 31. An elevator system for a tower structure, optionally for a wind turbine tower, comprising a vertically displaceable elevator car, the elevator car comprising:
a movable guide support structure;
a movable guide extending from a first end to a second end and connected to the support structure; wherein the movable guide is configured to be connected to a fixed guide attached to a tower structure and further configured to guide a transportation unit.

Clause 32. An elevator system according to clause 31 wherein the movable guide support structure of the elevator car and the movable guide are configured to support a transportation unit.

Clause 33. An elevator system according to any of clauses 31-32, wherein the support structure is mounted on the roof of the elevator car or is formed by the roof of the elevator car.

Clause 34. An elevator system according to any of clauses 31-32, wherein the support structure is mounted on the bottom of the elevator car or is formed by the bottom of the elevator car.

Clause 35. An elevator system according to any of clauses 31-32, wherein the support structure is mounted on a lateral side of the elevator car.

Clause 36. An elevator system according to any of clauses 31-35, wherein the elevator car comprises a hatch arranged on the roof of the elevator car for accessing to the elevator car.

Clause 37. A kit for performing assembly or maintenance operations in a tower structure comprising:
a transportation system according to any of clauses 1-30;
an elevator system comprising an elevator car according to any of clauses 31-36; and
wherein the movable guide of the elevator car is configured to guide the transportation unit of the transportation system.

Clause 38. A kit according to clause 37, wherein the kit comprises a first connecting guide for detachably connecting the movable guide of the elevator car and the fixed guide of the transportation system.

Clause 39. A kit according to any of clauses 37-38, wherein the first connecting guide is configured to connect the first end of the fixed guide to the first end of the movable guide.

Clause 40. A kit according to clause 39, wherein the first connecting guide comprises an outer first connecting guide and an inner first connecting guide.

Clause 41. A kit according to any of clauses 38-40, wherein the kit comprises a second connecting guide configured to detachably connect the second end of the fixed guide to the second end of the movable guide.

Clause 42. A kit according to clause 41, wherein the second connecting guide comprises an outer second connecting guide and an inner second connecting guide.

Clause 43. A kit according to any of clauses 38-42, wherein the first connecting guide and/or the second connecting guide comprise a telescopic extension extending from one of fixed guide and the movable guide to the other one.

Clause 44. A kit according to claim any of clauses 37-43, wherein the elevator car comprises a hatch arranged on the roof of the elevator car; and the transportation unit comprises a structure having a platform for supporting an operator and a guard rail system, the platform comprising a hatch; and wherein the hatch of the elevator car and the hatch of the transportation unit are arranged in such a way that an operator can access the transportation unit from the elevator car through the hatch of the elevator and the hatch of the transportation unit.

Clause 45. A method for performing assembly or maintenance operations in a tower structure, in particular in a wind turbine tower, comprising:
providing a kit according to any of clauses 37-44;
placing the transportation unit on the movable guide of the elevator car;
aligning the movable guide of the elevator car and the fixed guide;
connecting the movable guide and the fixed guide; and
horizontally displacing the transportation unit along the movable guide and/or the fixed guide to a desired position.

Clause 46. A method for performing assembly or maintenance operations according to clause 45, wherein aligning the movable guide and the fixed guide comprises vertically displacing the elevator car.

Clause 47. A method of performing assembly or maintenance operations according to any of clauses 45-46, wherein connecting the movable guide and the fixed guide comprises connecting the first end of the movable guide to the first end of the fixed guide and the second end of the movable guide to the second end of the fixed guide.

Clause 48. A tower section comprising:
a substantially cylindrical wall comprising an internal side and an external side, the substantially cylindrical wall vertically extending from a bottom portion to a top portion;
a fixed guide for guiding a transportation unit extending along the internal side of a circular perimeter of the wall; wherein the fixed guide comprises a mounting assembly attached to the internal side of the wall connecting the fixed guide to the wall.

Clause 49. A tower section according to clause 48, wherein the fixed guide extends 360° along the circular perimeter of the wall.

Clause 50. A tower section according to clause 48, wherein the fixed guide extends from a first end to a second end less than 360° along the circular perimeter of the wall.

Clause 51. A tower section according to clause 50, wherein the fixed guide extends between 270° and 350° along the circular perimeter of the wall.

Clause 52. A tower section according to any of clauses 48-51, wherein the fixed guide is configured to be connected to a movable guide mounted on an elevator car of an elevator system.

Clause 53. A tower section according to any of clauses 48-52, wherein the fixed guide comprises an outer rail and an inner rail, and optionally the outer rail and the inner rail are substantially parallel.

Clause 54. A tower section according to any of clauses 48-53, wherein the mounting assembly comprises a top bracket and a bottom bracket.

Clause 55. A tower section according to clause 54, wherein the top bracket and the bottom bracket are welded to the internal side of the wall.

Clause 56. A tower section according to any of clauses 54-55, wherein the mounting assembly comprises:
a transversal connecting bar connected to the top bracket and supporting the external and the internal rails; and
an inclined strut bar connected to the bottom bracket and supporting the transversal connecting bar.

Clause 57. A tower section according to any of clauses 48-56, wherein the tower section comprises several mounting assemblies.

Clause 58. A tower section according to any of clauses 48-57, wherein the tower section comprises an elevator path vertically extending along the internal side of the wall of a tower and is configured to allow the vertical movement of an elevator car of an elevator system.

Clause 59. A tower section according to clause 58, wherein the first end of the fixed guide extends from one of the vertical sides of the elevator path.

Clause 60. A tower section according to clause 59, wherein the second end of the fixed guide extends from the opposite vertical side of the of the elevator path to the first end of the fixed guide.

Clause 61. A tower section according to any of clauses 48-60, wherein the tower section comprises a central cavity defined by the internal wall and the fixed guide, wherein the central cavity continuously extends from the bottom portion to the top portion of the tower section.

Clause 62. A tower section according to any of clauses 48-61, wherein the tower section comprises several fixed guides.

Clause 63. A tower section according to any of clauses 48-62, wherein the tower section is a wind turbine tower section.

Clause 64. A tower comprising:
at least one tower section according to any of clauses 48-63;
an elevator system comprising an elevator car displacing along the elevator path of the tower section;
a transportation unit configured to displace along the fixed guide.

Clause 65. A tower according to clause 64, wherein the elevator car comprises a movable guide configured to be connected to the fixed guide of the tower section.

Clause 66. A tower according to clause 65, wherein the transportation unit is further configured to displace along the movable guide.

Clause 67. A tower according to any of clauses 64-66, wherein the elevator system is according to any of clauses 31-36.

Clause 68. A tower according to any of clauses 64-67, wherein the transportation unit is according to any of clauses 1-30.

Clause 69. A tower according to any of clauses 64-68, wherein the tower is a wind turbine tower.

Clause 70. A method of performing assembly or maintenance operations in a tower section, comprising:
providing a tower section according to any of clauses 48-63;
placing a transportation unit on a movable guide of an elevator car;
aligning the movable guide of an elevator car and the fixed guide;
connecting the movable guide and the fixed guide; and
horizontally displacing the transportation unit along the movable guide and/or the fixed guide to a desired position.

Clause 71. A method of performing assembly or maintenance operations according to clause 70, wherein aligning the movable guide and the fixed guide comprises vertically displacing the elevator car.

Clause 72. A method of performing assembly or maintenance operations according to any of clauses 70-71, wherein connecting the movable guide and the fixed guide comprises connecting the first end of the movable guide to the first end of the fixed guide and the second end of the movable guide to the second end of the fixed guide.

Clause 73. A trolley for displacing an operator along a guide arranged in a tower structure for performing assembly or maintenance operations comprising:
a structure having a platform for supporting the operator and a guard rail system;
an undercarriage for displacing the transportation unit along the fixed guide.

Clause 74. A trolley according to clause 73, wherein the undercarriage of the transportation unit is rotatably connected to the structure for horizontally rotating the structure with respect to the undercarriage.

Clause 75. A trolley according to any of clauses 73-74, wherein the platform comprises a hatch.

Clause 76. A trolley according to any of clauses 73-75, wherein the undercarriage of the transporting unit comprises a wheel assembly having at least one main wheel for rolling along a guide.

Clause 77. A trolley according to clause 76, wherein the wheel assembly further comprises a secondary wheel for engaging a guide in opposite sides.

Clause 78. A trolley according to any of clauses 76-77, wherein the main wheel and/or the secondary wheel comprise a central recess engaging a guide.

Clause 79. A trolley according to any of clauses 76-78, wherein the undercarriage of the transportation unit comprises at least two wheel assemblies and a frame connecting the at least two wheel assemblies.

Clause 80. A trolley according to clause 79, wherein the undercarriage comprises four wheel assemblies connected by the frame in pairs.

Clause 81. A trolley according to any of clauses 73-80, wherein the trolley further comprises a driving system for driving the undercarriage.

Clause 82. A trolley according to clause 81 wherein the driving system comprises a worm drive having a worm screw and a worm gear connected to one of the main wheels or to the pinion wheel, wherein the worm screw engages the worm gear.

Clause 83. A trolley according to clause 82, wherein the driving system is manually driven, and specifically the driving system comprises a crank for manually driving the driving system.

Clause 84. A trolley according to any of clauses 81-83, wherein the driving system comprises a motor, specifically an electrical motor, and more specifically the motor is a battery drill machine.

Clause 85. A trolley according to any of clauses 73-84, wherein the trolley is configured to be mounted on an elevator car of an elevator system.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the clauses that follow.

The invention claimed is:

1. A transportation system for performing assembly or maintenance operations in a tower structure, the transportation system comprising:
   (a) a fixed guide which: (1) is attached to a tower structure for guiding a transportation unit, (2) wherein the fixed guide is configured to be connected to a movable guide, which movable guide is configured to be mounted in an elevator car of an elevator system and (3) extends from a first end to a second end less than 360° along an internal circular perimeter of a tower structure; and
   (b) a transportation unit comprising a undercarriage for displacing the transportation unit along the fixed guide.

2. The transportation system according to claim 1, wherein the transportation unit comprises a robot.

3. The transportation system according to claim 1, wherein the transportation unit is a trolley configured to host an operator in the tower structure.

4. The transportation system according to claim 1, wherein the transportation unit comprises a structure having a platform for supporting an operator and a guard rail system.

5. The transportation system according to claim 1, wherein the undercarriage of the transportation unit is rotatably connected to a structure for horizontally rotating the structure with respect to the undercarriage.

6. The transportation system according to claim 1, wherein the transportation unit further comprises a driving system for driving the undercarriage.

7. The transportation system according to claim 1, wherein the fixed guide comprises an outer rail and an inner rail.

8. The transportation system according to claim 1, wherein the undercarriage comprises a wheel assembly having at least one main wheel for rolling along the fixed guide.

9. The transportation system according to claim 7, wherein the outer rail and inner rail are substantially parallel.

10. A kit for performing assembly or maintenance operations in a tower structure, comprising:
    (a) the transportation system according to claim 1;
    (b) an elevator system comprising an elevator car, the elevator car comprising:
      (1) a movable guide support structure;
      (2) a movable guide (i) which extends from a first end to a second end; (ii) wherein said movable guide is connected to the support structure; and (iii) is configured to (iii)(a) be connected to a fixed guide attached to a tower structure and (iii)(b) guide the transportation unit of the transportation system.

11. The kit according to claim 10, wherein the kit comprises a first connecting guide for detachably connecting the movable guide of the elevator car and the fixed guide of the transportation system.

12. The kit according to claim 11, wherein the first connecting guide is configured to connect the first end of the fixed guide to the first end of the movable guide.

13. The kit according to claim 12, wherein the kit further comprises a second connecting guide configured to detachably connect the second end of the fixed guide to the second end of the movable guide.

14. A method for performing assembly or maintenance operations in a tower structure, comprising:
    (a) providing a kit according to claim 10;
    (b) placing the transportation unit on the movable guide of the elevator car;
    (c) aligning the movable guide of the elevator car and the fixed guide;
    (d) connecting the movable guide of the elevator car and the fixed guide; and
    (e) horizontally displacing the transportation unit along the movable guide and/or fixed guide to a desired position.

15. The method according to claim 14, wherein the tower structure is a wind turbine tower.

16. The kit according to claim 10, wherein the movable guide support structure of the elevator car and the movable guide are configured to support a transportation unit.

17. The kit according to claim 10, wherein the tower structure is a wind turbine tower.

18. The transportation system according to claim 1, wherein the tower structure is a wind turbine tower.

* * * * *